United States Patent
Schmiz et al.

(10) Patent No.: US 6,906,293 B2
(45) Date of Patent: Jun. 14, 2005

(54) COMBINED SENSOR AND HEATING ELEMENT

(75) Inventors: Marc Schmiz, Luxembourg (LU); Paul Schockmel, Mamer (LU)

(73) Assignee: I.E.E. International Electronics & Engineering S.ar.L, Luxembourg (LU)

( * ) Notice: Subject to any disclaimer, the term of this patent is extended or adjusted under 35 U.S.C. 154(b) by 177 days.

(21) Appl. No.: 10/276,437

(22) PCT Filed: Apr. 23, 2001

(86) PCT No.: PCT/EP01/04549

§ 371 (c)(1),
(2), (4) Date: Nov. 15, 2002

(87) PCT Pub. No.: WO01/89267

PCT Pub. Date: Nov. 22, 2001

(65) Prior Publication Data
US 2003/0141983 A1 Jul. 31, 2003

(30) Foreign Application Priority Data
May 17, 2000 (LU) .................... 90583

(51) Int. Cl.⁷ .................................. H05B 1/02
(52) U.S. Cl. .............. 219/494; 219/217; 219/505; 219/528
(58) Field of Search ................. 219/200, 201, 219/212, 217, 482, 490, 494, 505, 520, 528, 546, 548, 549; 338/25, 26, 212; 374/152; 200/85 A

(56) References Cited

U.S. PATENT DOCUMENTS

| | | | |
|---|---|---|---|
| 3,537,053 A | * 10/1970 | Russell et al. | 338/25 |
| 4,628,188 A | 12/1986 | Andreasson | |
| 5,835,983 A | 11/1998 | McMahen et al. | |
| 5,948,303 A | * 9/1999 | Larson | 219/217 |
| 6,195,921 B1 | * 3/2001 | Truong | 36/136 |
| 6,541,737 B1 | * 4/2003 | Eksin et al. | 219/217 |
| 2003/0173195 A1 | * 9/2003 | Federspiel | 200/85 A |

FOREIGN PATENT DOCUMENTS

| | | |
|---|---|---|
| DE | 19717273 C1 | 7/1998 |
| DE | 19813559 A1 | 9/1999 |

* cited by examiner

Primary Examiner—Tu Hoang
(74) Attorney, Agent, or Firm—McCormick, Paulding & Huber LLP

(57) ABSTRACT

A combined sensor arid heating element includes a sensor mat having several active regions interconnected by flexible connection strips. The flexible connection strips each include two carrier foils laminated together having contact arrangements arranged in the active regions at the inside of the carrier foils. Each flexible connection strips further include a heat conductor directly applied to an outer side of one of the carrier foils.

24 Claims, 2 Drawing Sheets

COMBINED SENSOR AND HEATING ELEMENT

CROSS-REFERENCE TO RELATED APPLICATIONS

This application is entitled to the benefit of International Application No. PCT/EP01/04549 filed on Apr. 23, 2001 and Luxembourg Patent Application No. 90583 filed on May 17, 2000.

FIELD OF THE INVENTION

The present invention relates to a combined sensor and heating element, in particular to be employed in a vehicle seat.

BACKGROUND OF THE INVENTION

Modern vehicles are increasingly often equipped e.g. with so-called seat occupancy sensors which, in case of an accident, prevent the release of an airbag attributed to a certain vehicle seat if the corresponding vehicle seat is not occupied. Such seat occupancy sensors frequently comprise a sensor mat with a plurality of pressure-sensitive regions which are interconnected by flexible connection strips. The sensor mat is integrated into the vehicle seat such that the pressure-sensitive regions are distributed across the seat squab of the vehicle seat.

The increased consumer's demands on comfortableness moreover result in an increasing number of vehicle seats being equipped with a seat heater. Such a seat heater in general comprises a heating mat of a heat conductor embedded in two bonded fabrics layers. Such a heating mat, too, is integrated into the seat squab of the vehicle seat, such that the heat conductor essentially extends over the whole seat squab of the vehicle seat.

In case of vehicle seats equipped with a seat occupancy sensor as well as with a seat heater, the sensor mat and the heating mat are joined before they are installed in the seat to form a combined sensor and heating element. The manufacture of such a combined sensor and heating element, however, is relatively time consuming and expensive as the two function elements first have to be manufactured separately and then have to be fixed to one another.

SUMMARY OF THE INVENTION

Consequently, it is the object of the present invention to propose a simplified combined sensor and heating element.

According to the invention, this object is achieved by a combined sensor and heating element with a sensor mat having a plurality of active regions interconnected by flexible connection strips and by a heat conductor, the heat conductor being directly applied to the flexible connection strips of the sensor mat. With this sensor and heating element, the heat conductor therefore does not have to be embedded separately into a handy nonwoven laminate which is subsequently fixed to the sensor mat. The manufacture of such a combined sensor and heating element therefore requires essentially less individual steps than the manufacture of conventional combined elements. Moreover, less material is needed for the manufacture of the function element according to the invention than with conventional function elements. The combined sensor and heating element of the present invention therefore represents a particularly simple and inexpensive combined element.

It should be noted that the active regions of the sensor mat can comprise pressure-sensitive regions, i.e. that, for example, the electric properties of the active regions change depending on the weight applied to the sensor. In another embodiment, the active regions can also comprise simple control elements which only distinguish between two conditions, such as "occupied" and "not occupied". Moreover, for the present invention it is irrelevant whether the sensor function of the sensor and heating element according to the invention serves for the simple recognition of a seat occupancy or for the classification of a person sitting on the seat. In other words, the sensor mat can represent a simple seat occupancy sensor as well as a sensor for receiving or evaluating a pressure profile.

In case of a simple seat occupancy sensor extending in general only across the actual seat squab, the same can additionally comprise flexible strips extending over the beaded sides of the seat. Such flexible strips can simply be punched out of a carrier foil of the sensor and are therefore simple to be manufactured. The heat conductor then advantageously also extends over these additional sensor strips, so that the beaded sides of the seat, too, are heated. It should be noted that no active regions of the seat occupancy sensor have to be arranged in the additional strips.

In an advantageous embodiment of the invention, the heat conductor is covered by a protective layer. This protective layer can, for example, comprise a plastic foil or a bonded fabrics layer, which is preferably laminated onto the flexible connection strips of the sensor mat.

The heat conductor itself can be printed or glued onto the flexible connection strips of the sensor mat. In the latter case, the heat conductor for example comprises a semiconductor ink which is applied onto the connection lines via a serigraphy process.

In a particularly advantageous embodiment, the heat conductor comprises a high-resistivity material with a positive temperature coefficient. Such high-resistivity materials comprise a higher electric resistance with high temperatures than with low temperatures. With a proper material selection, this effect can be utilized for limiting the heat current, so that a complex downstream temperature control for the heating element can be omitted.

The electric connections of the sensor mat and the electric connections of the heat conductor are preferably arranged at a common terminal lug of the combined sensor and heating element. Thereby, a contacting of the two separate functions by a single plug element is allowed and the subsequent assembly is thus essentially facilitated. In a possible embodiment, the two separate function elements can, for example, be connected to a common electronic system. This electronic system then serves for evaluating the sensor mat as well as for supplying the heating mat and controlling the performance thereof. An intelligent control can, for example, prevent the seat heater from being switched on if the corresponding seat is not occupied.

With a common evaluation and supply circuit for the sensor mat and the heating mat, the heating control is preferably effected in a pulsed manner and with a delay with respect to the sensor sampling. Thereby, on the one hand the performance of the evaluation and supply electronics can be better utilized, on the other hand, mutual interferences of the two systems are largely excluded.

BRIEF DESCRIPTION OF THE DRAWINGS

In the following, one embodiment of the invention is described with reference to the enclosed Figures. In the drawings.

DETAILED DESCRIPTION OF THE PREFERRED EMBODIMENT

Figure 1:
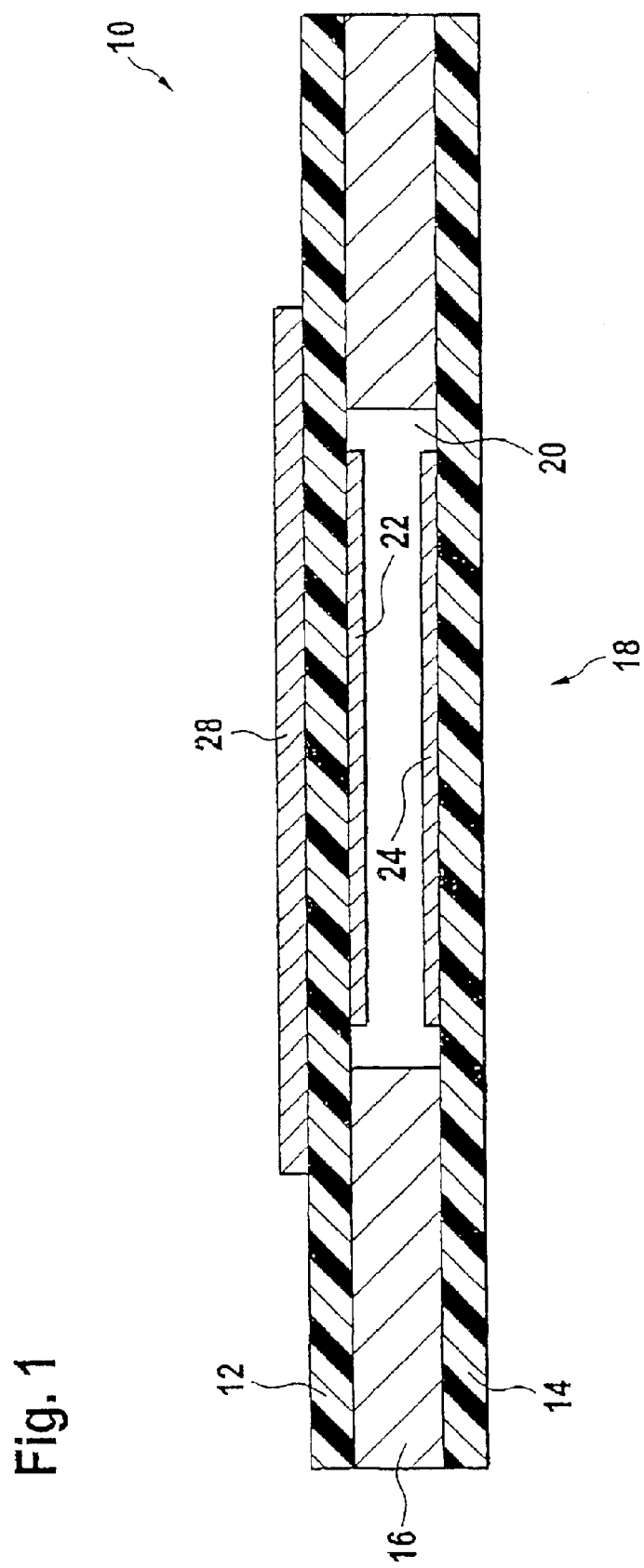
FIG. 1 shows a section through an embodiment of a combined sensor and heating element.
Figure 2:
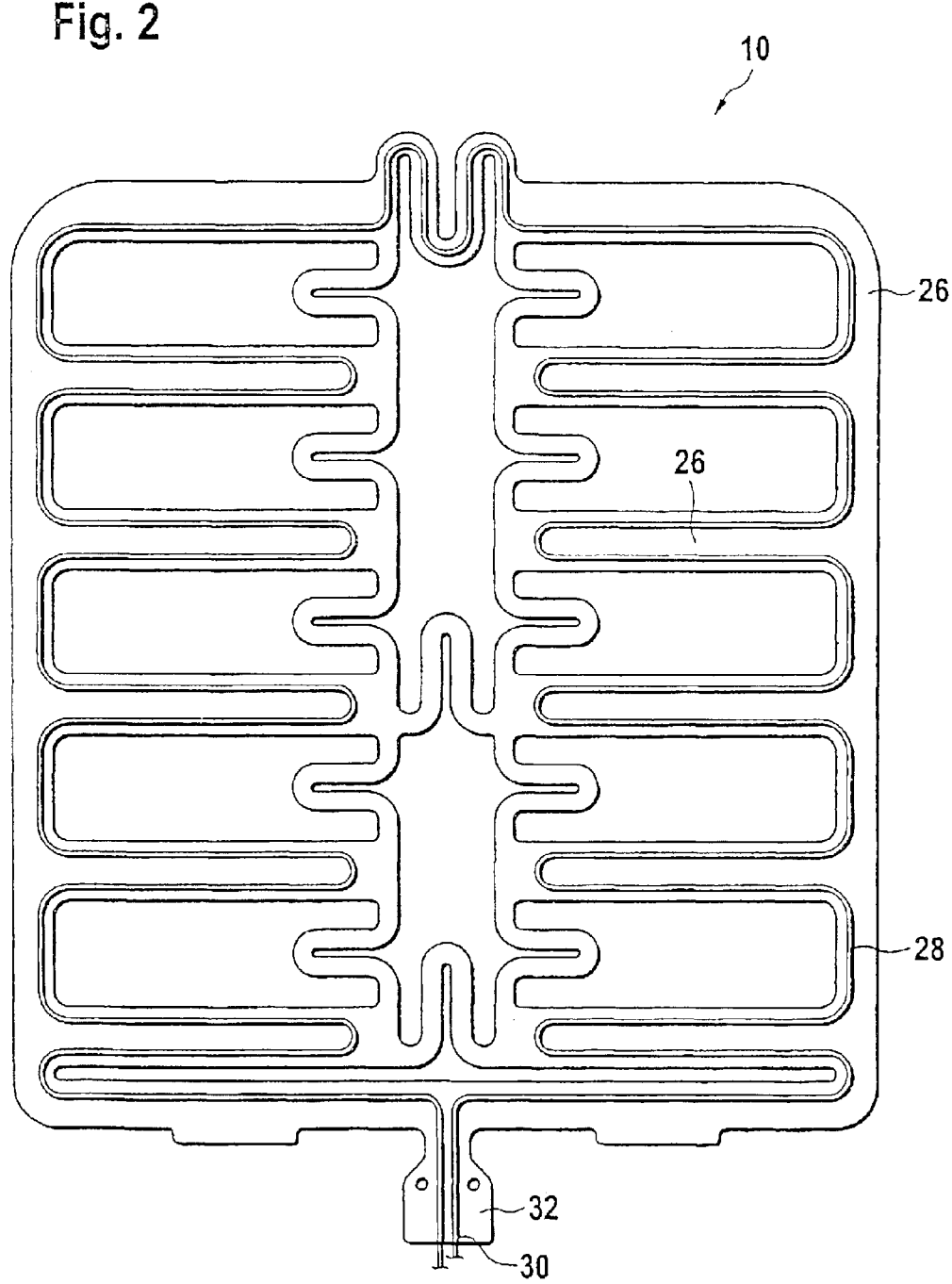
FIG. 2 shows a plan view onto an embodiment of a combined sensor and heating element.

Seat occupancy sensors or sensors for receiving or evaluating a seating profile are often designed as pressure-sensitive foil-style sheet sensors. Such a seat occupancy sensor in general comprises a plurality of active regions distributed across a certain area and interconnected by flexible connection lines of the sensor. Such a sensor is represented in FIGS. 1 and 2, FIG. 1 representing a section through an active region of the sensor.

The sensor comprises a first and a second carrier foil 12 and 14 laminated together by means of a spacer 16, for example a double-sided bonding sheet. In the region of the active regions 18 of the sensor 10, the spacer 16 comprises a recess 20, so that in this region the two carrier foils 12 and 14 are opposed in a spaced manner.

In the active region 18 of the sensor, contact arrays 22 and 24 are arranged at the inside of the carrier foils 12 and 14 between which an electric contact is created when the two carrier foils are compressed. The contact arrays 22 or 24, respectively, can, for example, comprise electrode structures, at least one of the contact arrays additionally comprising a layer of a pressure-sensitive material. The contact arrays are, for example, applied onto the corresponding areas of the carrier foils in a screening process before the carrier foils are laminated together.

Subsequently, regions where no active regions of the sensor are arranged are punched out of the thus manufactured sandwich construction, so that flexible connection lines 26 are formed (see FIG. 2), within which the active regions 18 of the seat occupancy sensor 10 are arranged and within which the electric connection lines for the active regions extend.

With the present seat occupancy sensor, on the outer side of the carrier foil 12, a heat conductor 28 is attached which extends along the flexible connection lines of the sensor. The course of the heat conductor here advantageously follows the connection lines, such that a good surface coverage of the heat conductor 28 is achieved. The two ends 30 of the heat conductor 28 passing through here preferably extend up to a terminal lug 32 which also receives the electric connections of the contact arrays of the active regions of the seat occupancy sensor. This allows a connection of the heat conductor to a source of heating current and a connection of the contact arrays to an evaluation electronics by means of a single plug element.

The heat conductor 28 is applied directly onto the carrier foil 12. It can be applied, for example to the carrier foil 12 by means of a screening process. In this case, the heat conductor, for example, comprises a semiconductor ink.

It should be noted that the heat conductor is preferably covered by a (non-depicted) protective layer after it has been applied onto the carrier foil 12. This protective layer can preferably comprise a plastic foil or alternatively a bonded fabrics layer which can be glued to the carrier foil 12.

If the sensor mat serves for the simple recognition of a seat occupancy or for the classification of a person sitting on the seat, the same in general comprises active regions in the region of the beaded sides of the seat and thus also flexible connection lines extending over the beaded sides. In case of a simple seat occupancy sensor extending in general only over the actual seat squab, the sensor can comprise additional flexible strips which extend over the beaded sides of the seat. Such flexible strips can simply be punched out of a carrier foil of the sensor and therefore are simple to be manufactured. The heat conductor then advantageously also extends over these additional sensor strips, so that the beaded sides of the seat, too, are heated. It should be noted that no active regions of the seat occupancy sensor have to be arranged in the additional strips. Furthermore, the flexible strips do not have to be punched out of a sandwich construction, but it is sufficient only for the carrier foil to which the heat conductor is attached to comprise such strips.

What is claimed is:

1. A combined sensor and heating element, comprising a sensor mat having several active regions interconnected by flexible connection strips, wherein the flexible connection strips comprise two carrier foils laminated together and wherein contact arrangements are arranged in the active regions at the inside of the carrier foils, said heating element further includes a heat conductor, said heat conductor being directly applied onto one outer side of one of the carrier foils of the flexible connection strips of the sensor mat.

2. The combined sensor and heating element according to claim 1, wherein the heat conductor is covered by a protective layer.

3. The combined sensor and heating element according to claim 2, wherein the protective layer comprises a plastic foil.

4. The combined sensor and heating element according to claim 2, wherein the protective layer comprises a bonded fabrics layer.

5. The combined sensor and heating element according to claim 2, wherein the protective layer is laminated onto the flexible connection strips of the sensor mat.

6. The combined sensor and heating element according to claim 1, wherein the heat conductor is glued onto the flexible connection strips of the sensor mat.

7. The combined sensor and heating element according to claim 1, wherein the heat conductor is printed onto the flexible connection strips of the sensor mat.

8. The combined sensor and heating element according to claim 7, wherein the heat conductor comprises a semiconductor ink.

9. The combined sensor and heating element according to claim 1, wherein the heat conductor comprises a high-resistivity material with a positive temperature coefficient.

10. The combined sensor and heating element according to claim 1, wherein electric connections of the sensor mat and electric connections of the heat conductor are arranged at a common terminal lug of the combined sensor and heating element.

11. The combined sensor and heating element according to claim 10, wherein the sensor mat and the heat conductor is connectable to a combined evaluation and supply circuit.

12. The combined sensor and heating element according to claim 1, wherein said combined sensor and heating elements are integrated within a vehicle seat.

13. A combined sensor and heating element, comprising a sensor mat having several active regions interconnected by flexible connection strips, said heating element further includes a heat conductor, said heat conductor being directly applied onto the flexible connection strips of the sensor mat.

14. The combined sensor and heating element according to claim 13, wherein the heat conductor is covered by a protective layer.

15. The combined sensor and heating element according to claim 14, wherein the protective layer comprises a plastic foil.

16. The combined sensor and heating element according to claim 14, wherein the protective layer comprises a bonded fabrics layer.

17. The combined sensor and heating element according to 14, wherein the protective layer is laminated onto the flexible connection strips of the sensor mat.

18. The combined sensor and heating element according to claim 13, wherein the heat conductor is glued onto the flexible connection strips of the sensor mat.

19. The combined sensor and heating element according to claim 13, wherein the heat conductor is printed onto the flexible connection strips of the sensor mat.

20. The combined sensor and heating element according to claim 19, wherein the heat conductor comprises a semiconductor ink.

21. The combined sensor and heating element according to claim 13, wherein the heat conductor comprises a high-resistivity material with a positive temperature coefficient.

22. The combined sensor and heating element according to claim 13, wherein electric connections of the sensor mat and electric connections of the heat conductor are arranged at a common terminal lug of the combined sensor and heating element.

23. The combined sensor and heating element according to claim 22, wherein the sensor mat and the heat conductor can be connected is connectable to a combined evaluation and supply circuit.

24. The combined sensor and heating element according to claim 13, wherein said combined sensor and heating elements are integrated within a vehicle seat.

* * * * *

UNITED STATES PATENT AND TRADEMARK OFFICE
CERTIFICATE OF CORRECTION

PATENT NO. : 6,906,293 B2
APPLICATION NO. : 10/276437
DATED : June 14, 2005
INVENTOR(S) : Marc Schmiz et al.

It is certified that error appears in the above-identified patent and that said Letters Patent is hereby corrected as shown below:

Title Page:
In the Abstract - Item (57):
 Line 9, after "a", please delete "heat conductor" insert --heating conductor--.

In the Specification:
 Column 1, line 31, after the second instance of "a", please delete "heat conductor" insert --heating conductor--.
 Column 1, line 34, after the first instance of "the", please delete "heat conductor" insert --heating conductor--.
 Column 1, line 52, after "a", please delete "heat conductor" insert --heating conductor--.
 Column 1, lines 52 - 53, after "the", please delete "heat conductor" insert --heating conductor--.
 Column 1, line 55, after "the", please delete "heat conductor" insert --heating conductor--.
 Column 2, line 18, after "the", please delete "heat conductor" insert --heating conductor--.
 Column 2, lines 23 - 24, after the second instance of "the", please delete "heat conductor" insert --heating conductor--.
 Column 2, line 28, after "the", please delete "heat conductor" insert --heating conductor--.
 Column 2, line 30, after "the", please delete "heat conductor" insert --heating conductor--.
 Column 2, lines 33 - 34, after "the", please delete "heat conductor" insert --heating conductor--.
 Column 2, line 42, after "the", please delete "heat conductor" insert --heating conductor--.
 Column 3, line 39, after "a", please delete "heat conductor" insert --heating conductor--.
 Column 3, line 41, after "the", please delete "heat conductor" insert --heating conductor--.
 Column 3, line 43, after the first instance of "the", please delete "heat conductor" insert --heating conductor--.
 Column 3, line 44, before "28", please delete "heat conductor" insert --heating conductor--.
 Column 3, lines 47 - 48, after "the", please delete "heat conductor" insert --heating conductor--.
 Column 3, line 51, after the first instance of "the", please delete "heat conductor" insert --heating conductor--.

UNITED STATES PATENT AND TRADEMARK OFFICE
CERTIFICATE OF CORRECTION

PATENT NO. : 6,906,293 B2
APPLICATION NO. : 10/276437
DATED : June 14, 2005
INVENTOR(S) : Marc Schmiz et al.

It is certified that error appears in the above-identified patent and that said Letters Patent is hereby corrected as shown below:

Column 3, lines 53 - 54, after "the", please delete "heat conductor" insert --heating conductor--.
Column 3, line 55, after "the", please delete "heat conductor" insert --heating conductor--.
Column 4, line 3, after "the", please delete "heat conductor" insert --heating conductor--.
Column 4, line 10, after "the", please delete "heat conductor" insert --heating conductor--.

In the Claims:
Claim 1:
Column 4, line 18, after "a", please delete "heat conductor" insert --heating conductor--.
Column 4, line 18, after "said", please delete "heat conductor" insert --heating conductor--.
Claim 2:
Column 4, line 22, after "the", please delete "heat conductor" insert --heating conductor--.
Claim 6:
Column 4, line 33, after "the", please delete "heat conductor" insert --heating conductor--.
Claim 7:
Column 4, line 36, after "the", please delete "heat conductor" insert --heating conductor--.
Claim 8:
Column 4, line 39, after "the", please delete "heat conductor" insert --heating conductor--.
Claim 9:
Column 4, line 42, after "the", please delete "heat conductor" insert --heating conductor--.
Claim 10:
Column 4, line 46, after "the", please delete "heat conductor" insert --heating conductor--.
Claim 11:
Column 4, line 50, after the second instance of "the", please delete "heat conductor" insert --heating conductor--.
Claim 13:
Column 4, line 58, after "a", please delete "heat conductor" insert --heating conductor--.
Column 4, line 58, after "said", please delete "heat conductor" insert --heating conductor--.

UNITED STATES PATENT AND TRADEMARK OFFICE
CERTIFICATE OF CORRECTION

PATENT NO. : 6,906,293 B2
APPLICATION NO. : 10/276437
DATED : June 14, 2005
INVENTOR(S) : Marc Schmiz et al.

It is certified that error appears in the above-identified patent and that said Letters Patent is hereby corrected as shown below:

In the Claims (continued):
Claim 14:
  Column 4, line 61, after "the", please delete "heat conductor" insert --heating conductor--.
Claim 18:
  Column 5, line 5, after the first instance of "the", please delete "heat conductor" insert --heating conductor--.
Claim 19:
  Column 5, line 8, after the first instance of "the", please delete "heat conductor" insert --heating conductor--.
Claim 20:
  Column 5, line 11, after "the", please delete "heat conductor" insert --heating conductor--.
Claim 21:
  Column 5, line 14, after "the", please delete "heat conductor" insert --heating conductor--.
Claim 22:
  Column 6, line 3, after "the", please delete "heat conductor" insert --heating conductor--.
Claim 23:
  Column 6, line 7, after the second instance of "the", please delete "heat conductor" insert --heating conductor--.

Signed and Sealed this

Twenty-fourth Day of March, 2009

JOHN DOLL
*Acting Director of the United States Patent and Trademark Office*